(12) United States Patent
Ma

(10) Patent No.: US 10,868,398 B2
(45) Date of Patent: Dec. 15, 2020

(54) ELECTRICAL CONNECTOR MODULE FITTED WITHIN A BICYCLE FRAME

(71) Applicant: DARFON ELECTRONICS CORP., Taoyuan (TW)

(72) Inventor: An-Yi Ma, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 16/429,063

(22) Filed: Jun. 3, 2019

(65) Prior Publication Data

US 2019/0386444 A1    Dec. 19, 2019

(30) Foreign Application Priority Data

Jun. 19, 2018   (TW) .............................. 107120971 A

(51) Int. Cl.

| | |
|---|---|
| *B62J 11/19* | (2020.01) |
| *B62M 6/50* | (2010.01) |
| *B62M 6/90* | (2010.01) |
| *H01R 13/73* | (2006.01) |
| *H01R 31/06* | (2006.01) |
| *B62J 99/00* | (2020.01) |
| *H01R 13/52* | (2006.01) |
| *B62J 45/00* | (2020.01) |

(52) U.S. Cl.

CPC .............. *H01R 31/06* (2013.01); *B62J 11/19* (2020.02); *B62J 99/00* (2013.01); *H01R 13/5213* (2013.01); *H01R 13/73* (2013.01); *B62J 45/00* (2020.02); *B62M 6/50* (2013.01); *B62M 6/90* (2013.01); *H01R 2201/26* (2013.01)

(58) Field of Classification Search

CPC ....... B62K 2206/00; B62M 6/80; B62J 11/19; B62J 43/28; B62J 45/00; B62J 99/00; H01R 13/73; H01R 31/06; H01R 2201/26

See application file for complete search history.

(56) References Cited

U.S. PATENT DOCUMENTS

| | | | |
|---|---|---|---|
| 8,960,702 B2 * | 2/2015 | Vollmer | B62M 6/40 280/281.1 |
| 9,496,649 B2 * | 11/2016 | Burns | H01R 13/64 |
| 2013/0233091 A1 | 9/2013 | Tetsuka | |

FOREIGN PATENT DOCUMENTS

| | | |
|---|---|---|
| CN | 206407048 U | 8/2017 |
| ES | 1 191 458 U | 9/2017 |
| TW | I606953 B | 12/2017 |
| WO | 2012/117641 A1 | 9/2012 |
| WO | 2018/199763 A2 | 11/2018 |

\* cited by examiner

*Primary Examiner* — Vanessa Girardi
(74) *Attorney, Agent, or Firm* — Wintson Hsu

(57) ABSTRACT

A connector module for an electric bicycle is disclosed. The electric bicycle has a first tube and a second tube. The connector module is disposed on intersection between the first tube and the second tube. The connector module includes a first connector and a second connector. The first connector is connected to a first electronic device disposed inside the first tube. The second connector is jointed with the second connector and connected to a second electronic device disposed inside the second tube.

8 Claims, 5 Drawing Sheets

US 10,868,398 B2

ELECTRICAL CONNECTOR MODULE FITTED WITHIN A BICYCLE FRAME

BACKGROUND OF THE INVENTION

1. Field of the Invention

The present invention relates to a connector, and more particularly, to a connector module applied to an electric bicycle and having a modular property for rapidly assembling with and disassembling from an electronic device and a related electric bicycle.

2. Description of the Prior Art

One frame tube of an electric bicycle does not have large space to accommodate a control module and a battery module, and thus the control module and the battery module are respectively disposed inside different frame tubes of the conventional electric bicycle. In a conventional way, several energy wires and several signal wires are manually soldered onto the frame tubes for establishing energy transmission and signal transmission between the control module and the battery module, which has drawbacks of low reliability and long service time. As the electric bicycle is repaired, it is difficult to remove the energy wires and the signal wires from the frame tubes.

SUMMARY OF THE INVENTION

The present invention provides a connector module applied to an electric bicycle and having a modular property for rapidly assembling with and disassembling from an electronic device and a related electric bicycle for solving above drawbacks.

According to the claimed invention, a connector module is applied to an electric bicycle, the electric bicycle has a first tube and a second tube, and the connector module is disposed on intersection between the first tube and the second tube. The connector module includes a first connector, a second connector, a wire set and a bridging component. The first connector is electrically connected to a first electronic device disposed inside the first tube. The second connector is electrically connected to a second electronic device disposed inside the second tube. The wire set is electrically connected to the first connector and the second connector. Two ends of the bridging component are respectively connected to the first connector and the second connector.

According to the claimed invention, an electric bicycle includes a first tube, a second tube, a first connector, a second connector, a wire set and a bridging component. The second tube is crossed by the first tube. The first connector is electrically connected to a first electronic device disposed inside the first tube. The second connector is electrically connected to a second electronic device disposed inside the second tube. The wire set is electrically connected to the first connector and the second connector. Two ends of the bridging component are respectively connected to the first connector and the second connector.

The connector module of the present invention utilizes the bridging component to connect the first connector and thee second connector, and at least one of the first connector and the second connector can be bent relative to the bridging component, so that the connector module can be disposed on the intersection between the bending tubes. If the first connector and the second connector are not bent relative to the bridging component, the connector module still can be disposed inside the straight tube. The connector module of the present invention can have a function of conveniently assembling and disassembling the first electronic device or the second electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
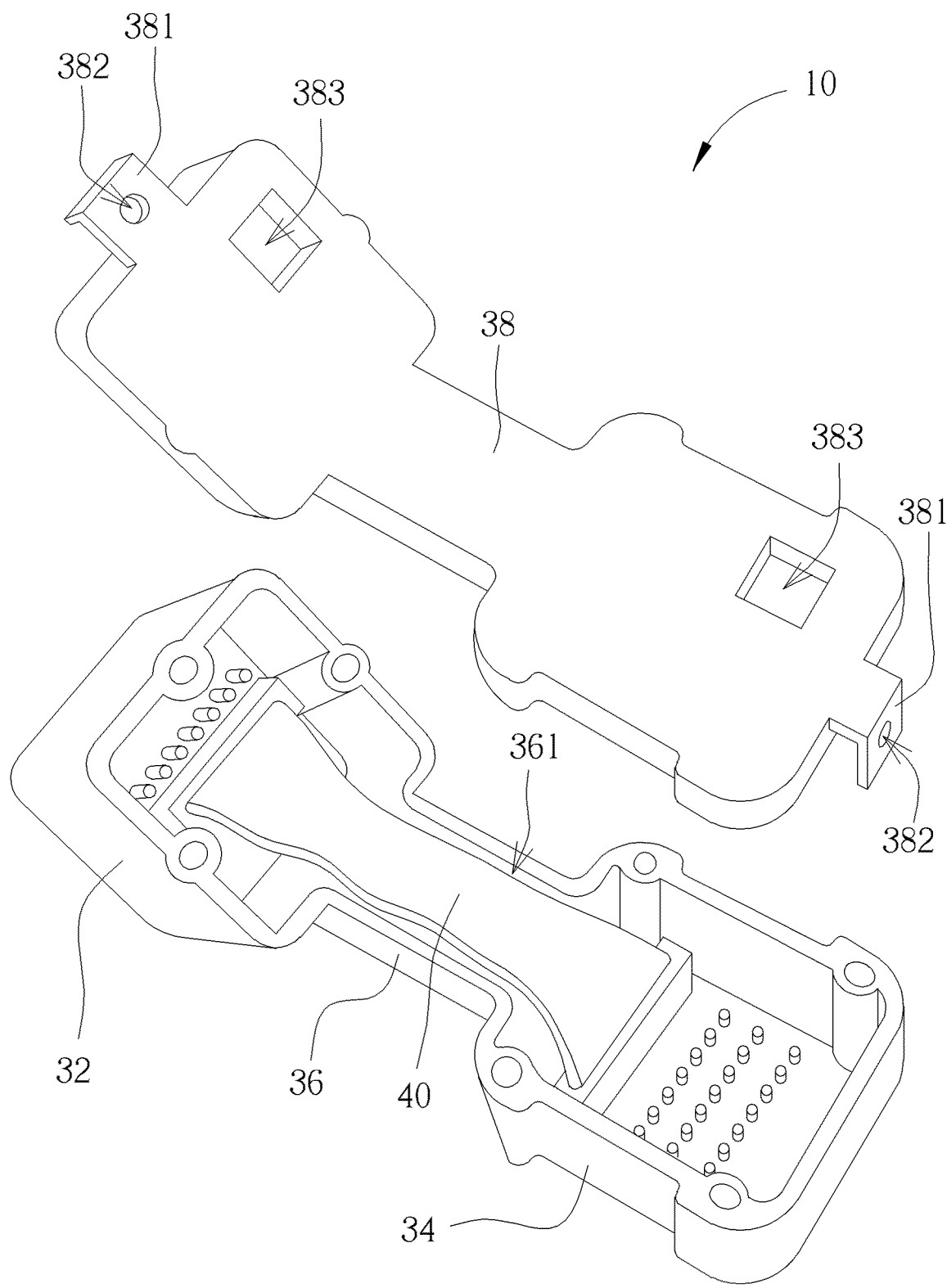
FIG. 1 is a diagram of a connector module according to an embodiment of the present invention.
Figure 2:
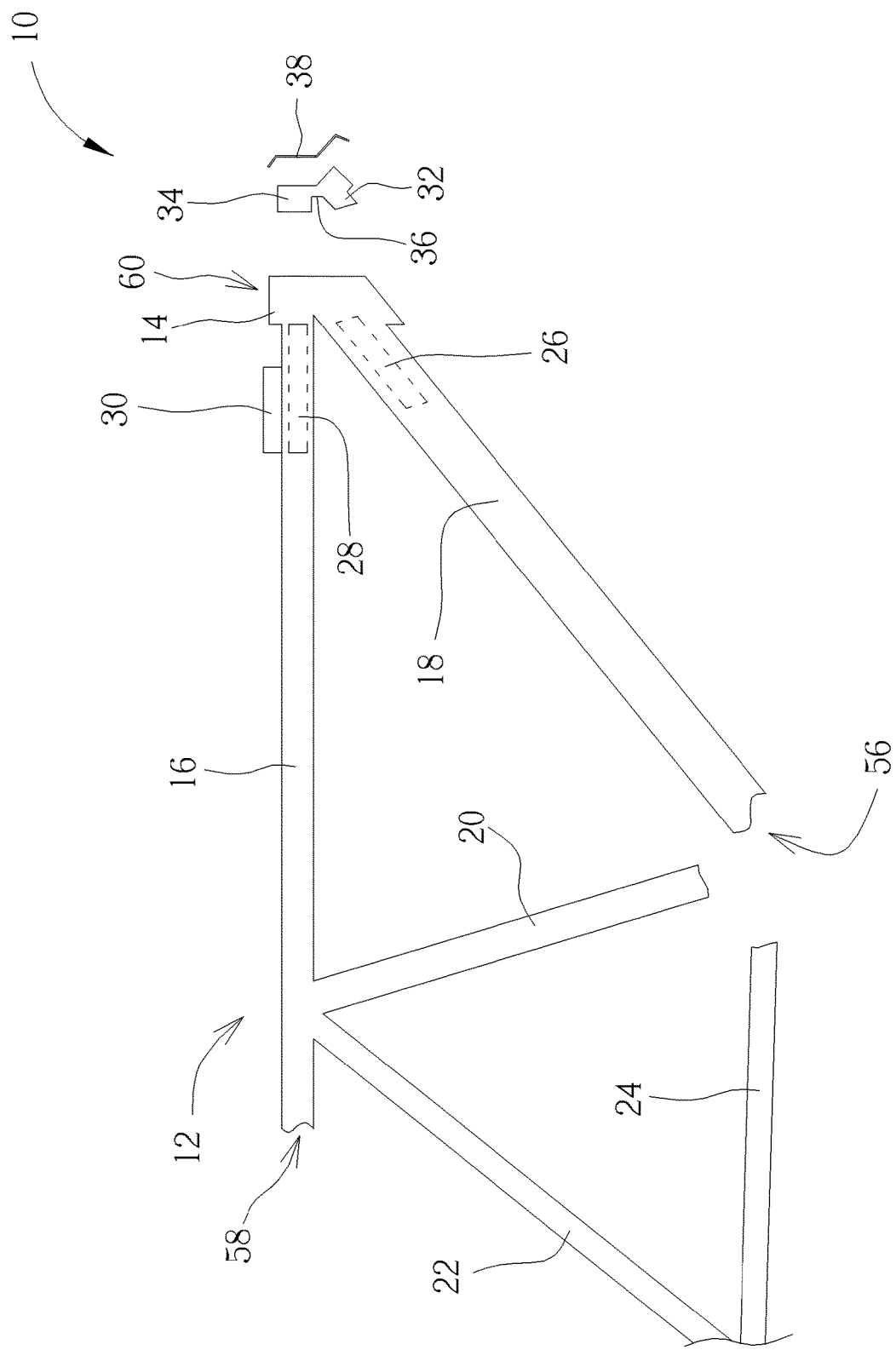
FIG. 2 is a diagram of the connector module land a bicycle frame according to the embodiment of the present invention.
Figure 3:
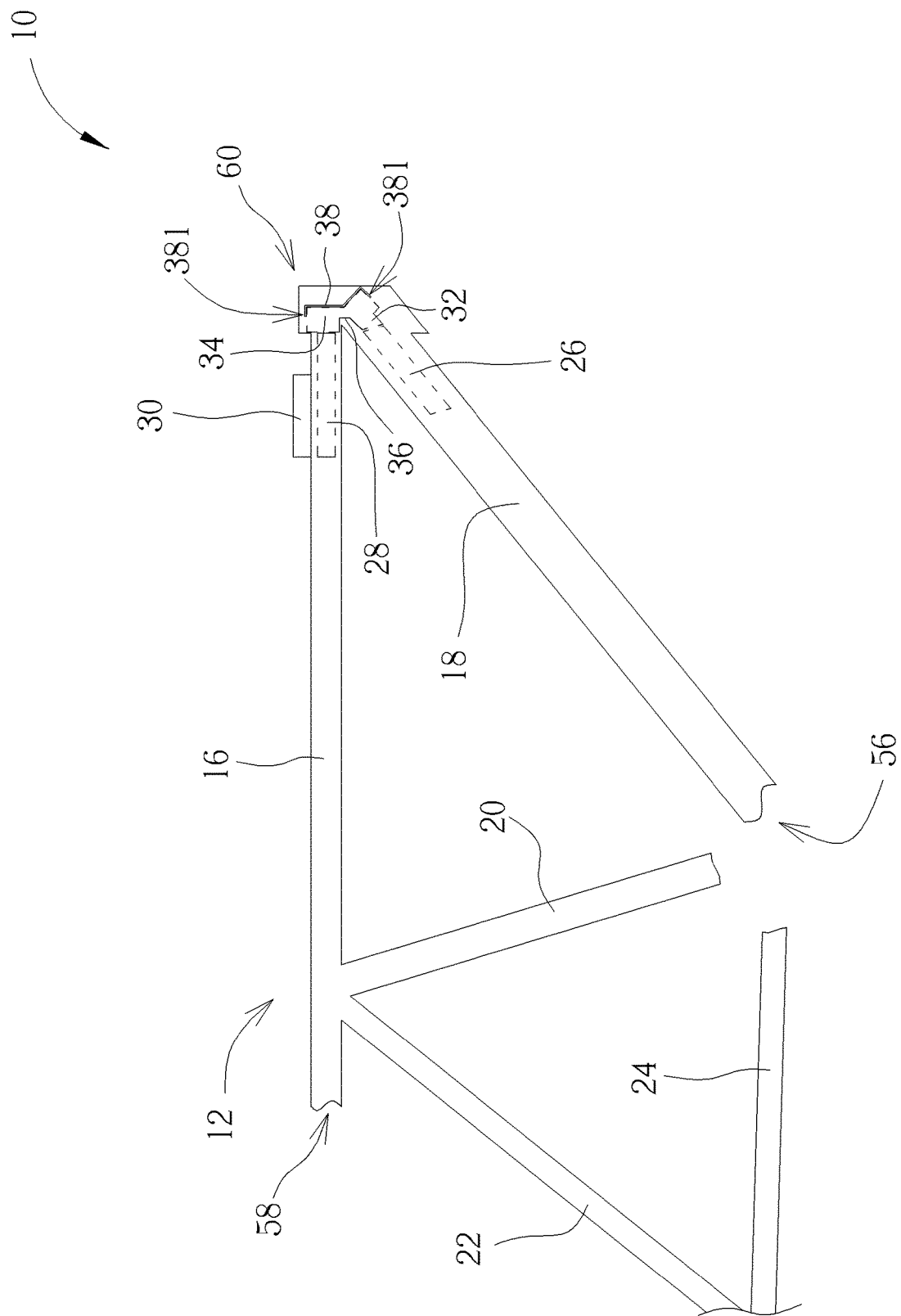
FIG. 3 is a diagram of the connector module disposed inside the bicycle frame according to the embodiment of the present invention.

Please refer to FIG. 1 to FIG. 3. FIG. 1 is a diagram of a connector module 10 according to an embodiment of the present invention. FIG. 2 is a diagram of the connector module 10 and a bicycle frame 12 according to the embodiment of the present invention. FIG. 3 is a diagram of the connector module 10 disposed inside the bicycle frame 12 according to the embodiment of the present invention. Generally, the bicycle frame 12 of an electric bicycle can include a plurality of tubes, such as a head tube 14, a top tube 16, a down tube 18, a seat tube 20, a seat stay tube 22 and a chain stay tube 24. The head tube 14 can be connected to a handle bar and a front tire. The seat tube 20 can be connected to a saddle and a pedal. The seat stay tube 22 and the chain stay tube 24 can be connected to a rear tire. The connector module 10 can be disposed on intersection between the first tube and the second tube of the bicycle frame 12.

For example, the connector module 10 can be disposed on the intersection between the top tube 16 and the down tube 18, which means the down tube 18 is represented as the first tube and the top tube 16 is represented as the second tube. The connector module 10 further can be disposed on other tubes of the bicycle frame 12, such as intersection between the top tube 16 and the seat tube 20, or intersection between the down tube 18 and the seat tube 20, which depends on actual demand. In addition, a tube structure of the bicycle frame 12 is not limited to the embodiment shown in the figures; for instance, a bicycle frame of the folding bicycle may have different tube structure. Any connector module 10 of being disposed between two tubes of the bicycle frame 12 can belong to a scope of the present invention.

A first electronic device 26 can be disposed into the down tube 18 via a second hole 56, and a second electronic device 28 can be disposed into the top tube 16 via a first hole 58, which means the down tube 18 accommodates the first electronic device 26 and the top tube 16 accommodates the second electronic device 28. In the embodiment, the first electronic device 26 is an energy storage device, and the second electronic device 28 is an operation processing device. The operation processing device (which means the second electronic device 28) has a microprocessor and electrically connected to a motor, a speed sensor, a torque sensor and a battery. The energy storage device (which means the first electronic device 26) provides energy to the operation processing device and the motor. A displaying interface 30 can be disposed on the second electronic device 28 and exposed via a hole (not shown in the figures) on the top tube 16. The displaying interface 30 can display information about vehicle speed, energy quantity and mileage.

The connector module 10 can include a first connector 32, a second connector 34, a bridging component 36, a covering component 38 and a wire set 40. The connector module 10 can be disposed inside the head tube 14 via a third hole 60, so that the first connector 32 can be electrically connected to the first electronic device 26 and the second connector 34 can be electrically connected to the second electronic device 28. The first connector 32 and the second connector 34 are electrically connected to each other via the wire set 40 for energy supply and signal transmission. Two ends of the bridging component 36 are respectively connected to the first connector 32 and the second connector 34 in a detachable manner or in a fixable manner. The wire set 40 is detachably connected to the first connector and the second connector 34. Connecting portions 381 are respectively disposed on two ends of the covering component 38. Each connecting portion 381 has a positioning hole 382. An external fixing component (such as a screw or a bolt) can pass through the positioning hole 382 and be fixed on an end of the top tube 16 or an end of the down tube 18.

Figure 4:
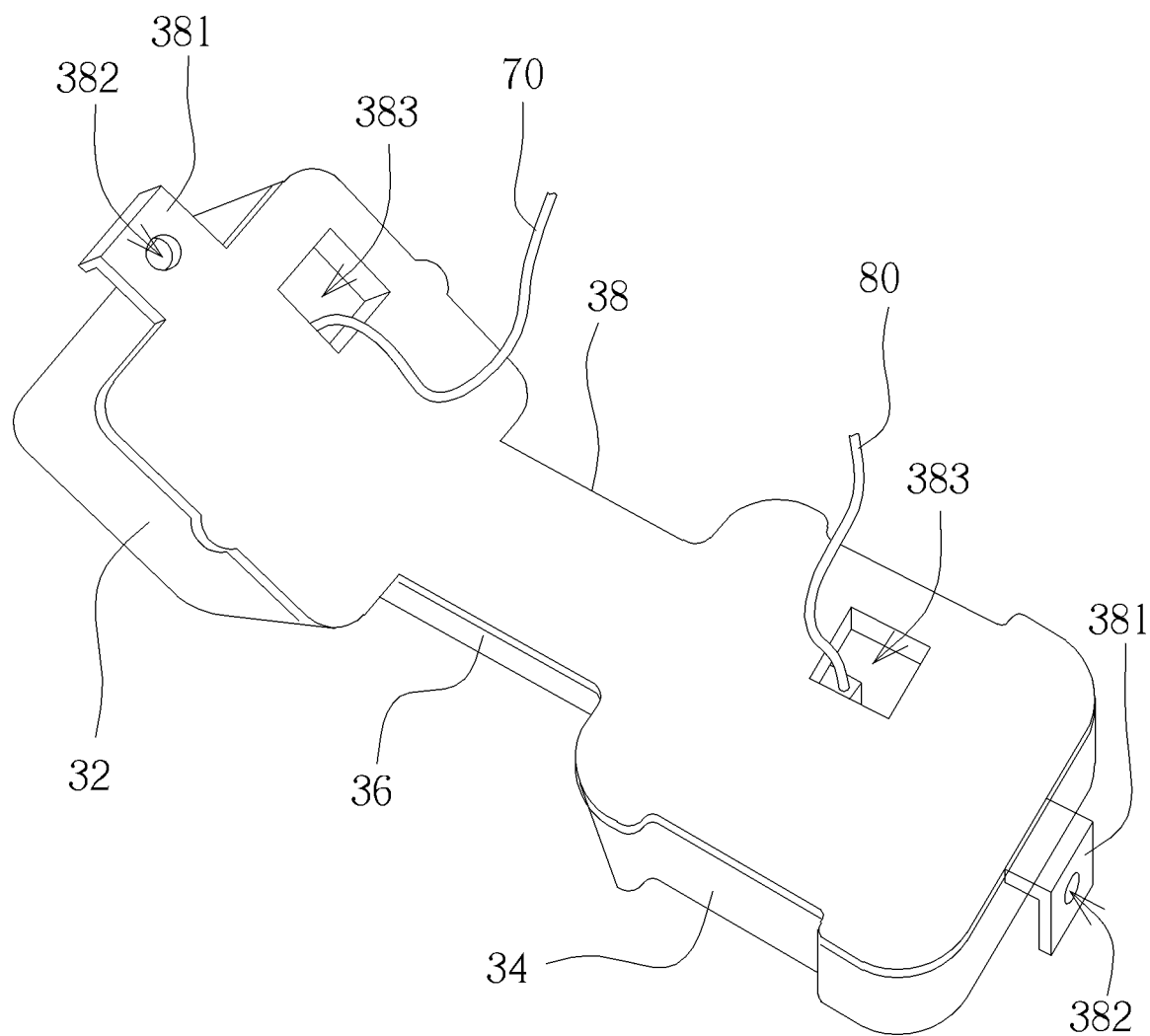
FIG. 4 is a diagram of the connector module according to another embodiment of the present invention.

The covering component 38 is detachably disposed on the bridging component 36. As shown in FIG. 1, the wire set 40 can be disposed inside a sunken structure 361 of the bridging component 36. The covering component 38 can be assembled with the bridging component 36 to cover the wire set 40. Please refer to FIG. 4. FIG. 4 is a diagram of the connector module 10 according to another embodiment of the present invention. A first wire 70 may be extended out of an opening structure 383 on the covering component 38 and can be electrically connected to the motor. A second wire 80 may be extended out of the opening structure 383 and can be electrically connected to an external sensor, such as the torque sensor and the speed sensor. Application of the first wire 70 and the second wire 80 is not limited to the above-mentioned embodiment, and depends on actual demand.

Figure 5:
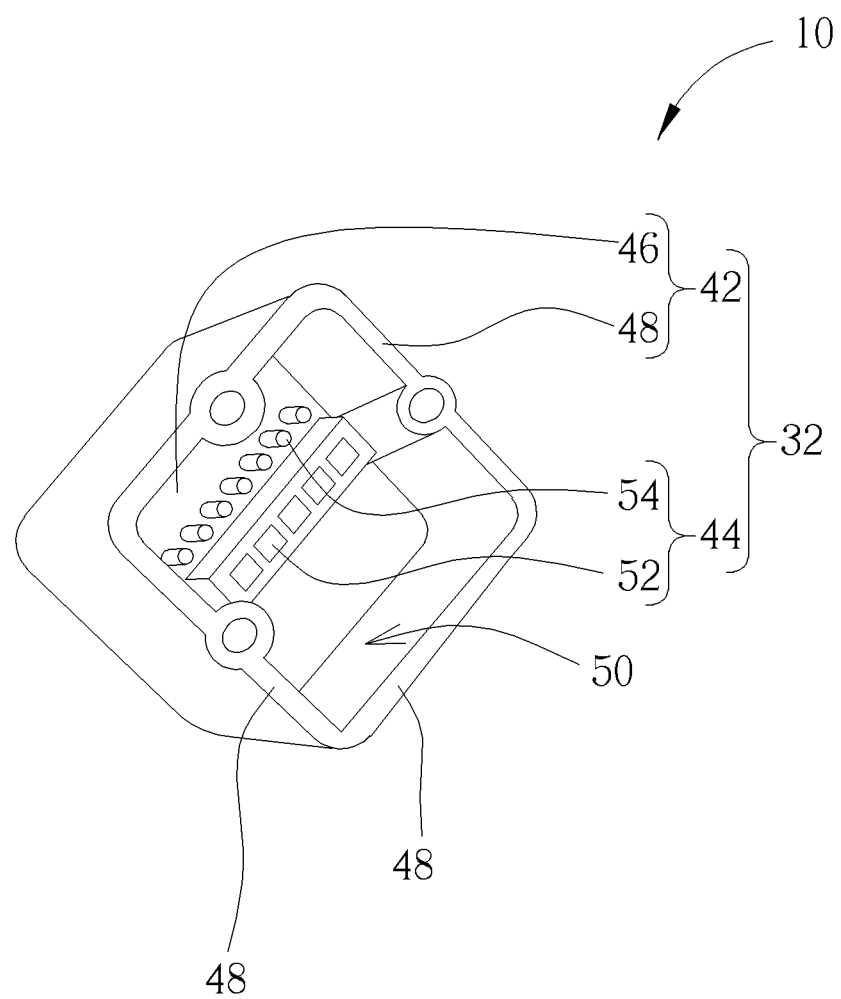
FIG. 5 is an enlarged diagram of a part of the connector module according to the embodiment of the present invention.

Please refer to FIG. 1 to FIG. 5. FIG. 5 is an enlarged diagram of a part of the connector module 10 according to the embodiment of the present invention. The first connector 32 can include a casing 42 and at least one pin 44. The casing 42 can have a bottom portion 46 and several lateral portions 48. The lateral portions 48 are respectively disposed on edges of the bottom portion 46 to form an accommodating space 50. The pin 44 can be disposed inside the accommodating space 50. It should be mentioned that an amount of the pin 44 can be plural, and a plurality of pins 44 can include large-size pins 52 and small-size pins 54. The large-size pins 52 can have an advantage of preferred heat dissipating efficiency, and be applied for energy transmission and disposed on the outside of the small-size pins 54. The small-size pins 54 can be applied for signal transmission, and each small-size pin 54 may have specific standard according to design demand. Structural design of the second connector 34 is similar to structural design of the first connector 32, and a detailed description is omitted herein for simplicity.

The connector module of the present invention utilizes the bridging component to connect the first connector and thee second connector, and at least one of the first connector and the second connector can be bent relative to the bridging component, so that the connector module can be disposed on the intersection between the bending tubes. If the first connector and the second connector are not bent relative to the bridging component, the connector module still can be disposed inside the straight tube. Comparing to the prior art, the connector module of the present invention can have a function of conveniently assembling and disassembling the first electronic device or the second electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connector module applied to an electric bicycle, the electric bicycle having a first tube and a second tube, and the connector module being disposed on intersection between the first tube and the second tube, the connector module comprising:
   a first connector electrically connected to a first electronic device disposed inside the first tube;
   a second connector electrically connected to a second electronic device disposed inside the second tube;
   a wire set electrically connected to the first connector and the second connector;
   a bridging component, two ends of the bridging component being respectively connected to the first connector and the second connector; and
   a covering component disposed on the bridging component and adapted to cover the wire set, wherein the covering component comprises a connecting portion fixed on an end of the first tube or the second tube.

2. The connector module of claim 1, wherein the bridging component comprises a sunken structure adapted to accommodate the wire set.

3. The connector module of claim 1, wherein the covering component comprises an opening structure, the first connector is electrically connected to a first wire, and the first wire is extended out of the opening structure.

4. The connector module of claim 1, wherein the covering component comprises an opening structure, the second connector is electrically connected to a second wire, and the second wire is extended out of the opening structure.

5. An electric bicycle, comprising:
   a first tube;
   a second tube crossed by the first tube;
   a first connector electrically connected to a first electronic device disposed inside the first tube;
   a second connector electrically connected to a second electronic device disposed inside the second tube;
   a wire set electrically connected to the first connector and the second connector;
   a bridging component, two ends of the bridging component being respectively connected to the first connector and the second connector; and
   a covering component detachably disposed on the bridging component and adapted to cover the wire set, wherein the covering component comprises a connecting portion fixed on an end of the first tube or the second tube.

6. The electric bicycle of claim 5, wherein the bridging component comprises a sunken structure adapted to accommodate the wire set.

7. The electric bicycle of claim 5, wherein the covering component comprises an opening structure, the first connector is electrically connected to a first wire, and the first wire is extended out of the opening structure.

8. The electric bicycle of claim 5, wherein the covering component comprises an opening structure, the second connector is electrically connected to a second wire, and the second wire is extended out of the opening structure.

* * * * *